(12) United States Patent
Liao

(10) Patent No.: US 9,242,529 B2
(45) Date of Patent: Jan. 26, 2016

(54) VENTILATION DEVICE

(76) Inventor: Chin-Tuan Liao, Chaozhou Township, Pingtung County (TW)

( * ) Notice: Subject to any disclaimer, the term of this patent is extended or adjusted under 35 U.S.C. 154(b) by 882 days.

(21) Appl. No.: 13/525,404

(22) Filed: Jun. 18, 2012

(65) Prior Publication Data

US 2012/0329381 A1 Dec. 27, 2012

(30) Foreign Application Priority Data

Jun. 22, 2011 (TW) .............................. 100211350 U

(51) Int. Cl.
*F24F 7/06* (2006.01)
*B60H 1/00* (2006.01)
*F24F 7/013* (2006.01)
*F24F 13/08* (2006.01)
*B60H 1/24* (2006.01)

(52) U.S. Cl.
CPC ............ *B60H 1/00464* (2013.01); *B60H 1/244* (2013.01); *B60H 1/248* (2013.01); *F24F 7/013* (2013.01); *F24F 13/082* (2013.01)

(58) Field of Classification Search
USPC ........................................ 454/354

IPC ................... B60H 1/00464,1/244; F24F 13/082
See application file for complete search history.

(56) References Cited

U.S. PATENT DOCUMENTS

| 6,135,875 A * | 10/2000 | French ................... H02B 1/565 361/695 |
| 6,554,698 B2 * | 4/2003 | Kranzdorf ............ H05K 7/2019 137/849 |

* cited by examiner

*Primary Examiner* — Steven B McAllister
*Assistant Examiner* — Helena Kosanovic
(74) *Attorney, Agent, or Firm* — Alan D. Kamrath; Kamrath IP Lawfirm, P.A.

(57) ABSTRACT

A ventilation device includes an impeller rotatable to move air from an air inlet end to an air outlet end of the impeller. An opening is defined in a rear end of the housing. The rear end of the housing is fixed to the air inlet end of the impeller. The housing includes a hemispherical wall defining an interior space. The hemispherical wall has a plurality of annularly spaced and a plurality of annularly spaced outer holes, with the inner holes spaced from the outer holes in a radial direction. A plurality of tubes is formed on an inner face of the semispherical wall, with each tube extending from a corresponding one of the inner and outer holes into the interior space but spaced from the rear end of the housing.

6 Claims, 7 Drawing Sheets

VENTILATION DEVICE

BACKGROUND OF THE INVENTION

The present invention relates to a ventilation device and, more particularly, to a ventilation device mounted in an air outlet of a closed or indoor space for increasing air movement.

An exhaust fan is generally provided in an air exhaust path to increase air movement in a closed or indoor space. A conventional exhaust fan includes an impeller for expelling the air in the closed or indoor space through the air exhaust path. However, an elbow or a filter is generally mounted to an air outlet section of the exhaust fan, adversely affecting flowing smoothness of the air. Specifically, a positive pressure is created in the air outlet section to which the elbow or filter is mounted, causing turbulence in the air inlet of the exhaust fan and reducing the air movement.

BRIEF SUMMARY OF THE INVENTION

An objective of the present invention is to provide a ventilation device mounted in an air outlet of a closed or indoor space for increasing air convection between hot air and cold air, achieving an energy-saving effect.

A ventilation device according to the present invention includes an impeller having an air inlet end and an air outlet end spaced from the air inlet end along a central axis of the impeller. The air inlet end of the impeller includes an air inlet. The impeller is rotatable to suck air into the air inlet and to move the air from the air inlet to the air outlet end. A housing includes a front end and a rear end spaced from the front end along the central axis of the impeller. The housing includes an opening in the rear end. The rear end of the housing is fixed to the air inlet end of the impeller. The housing includes a hemispherical wall having an inner face, with the hemispherical wall defining an interior space. The hemispherical wall has a plurality of inner holes and a plurality of outer holes, with the plurality of inner holes annularly spaced from each other in a circumferential direction about a central axis of the housing, with the plurality of outer holes annularly spaced from each other in the circumferential direction about the central axis of the housing, with the plurality of inner holes spaced from the plurality of outer holes in a radial direction perpendicular to the central axis of the housing. A plurality of first tubes is formed on the inner face of the semispherical wall, with each first tube extending from one of the plurality of inner holes into the interior space but spaced from the rear end of the housing. A plurality of second tubes is formed on the inner face of the semispherical wall, with each second tube extending from one of the plurality of outer holes into the interior space but spaced from the rear end of the housing.

In an example, the hemispherical wall of the housing further includes a plurality of intermediate holes annularly spaced from each other. A first spacing between each of the plurality of inner holes and the central axis of the housing is smaller than a second spacing between each of the plurality of intermediate holes and the central axis of the housing. The second spacing is smaller than a third spacing between each of the plurality of outer holes and the central axis of the housing. A plurality of third tubes is formed on the inner face of the semispherical wall, with each third tube extending from one of the plurality of intermediate holes into the interior space but spaced from the rear end of the housing. Each first tube has a first length smaller than a second length of each second tube. Each third tube has a third length larger than the first length and smaller than the second length. Each of the first, second, and third tubes includes a hole coaxial to and having an inner diameter equal to a corresponding one of the plurality of inner holes, the plurality of outer holes, and the plurality of intermediate holes.

A connecting board can be mounted between the rear end of the housing and the air inlet end of the impeller. The connecting board includes a through-hole coaxial to the opening of the housing and to the air inlet of the impeller. The through-hole of the connecting board has a diameter substantially equal to an inner diameter of the air inlet of the impeller but smaller than a diameter of the opening of the housing.

In a form shown, the central axis of the housing is coaxial to a rotating axis of the impeller. An outer diameter of all of the plurality of outer holes is substantially equal to an outer diameter of the air outlet end of the impeller.

In an example, an inner end face of each of the first, second, and third tubes extends perpendicularly to the central axis of the housing.

In another example, an inner end face of each of the first, second, and third tubes is at an acute angle to the central axis of the housing.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
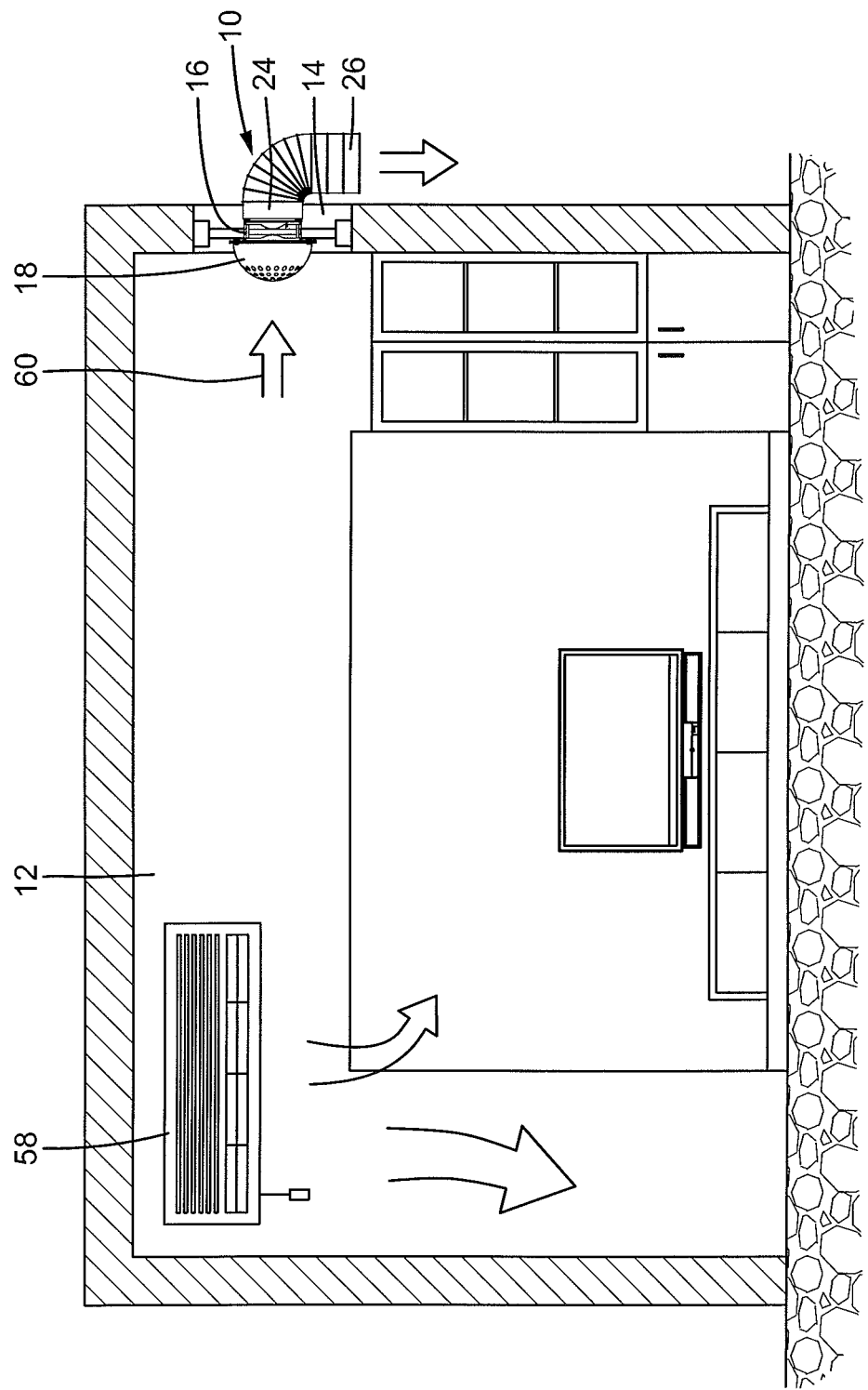
FIG. 1 shows a schematic view illustrating use of a ventilation device according to the present invention in an indoor space.
Figure 2:
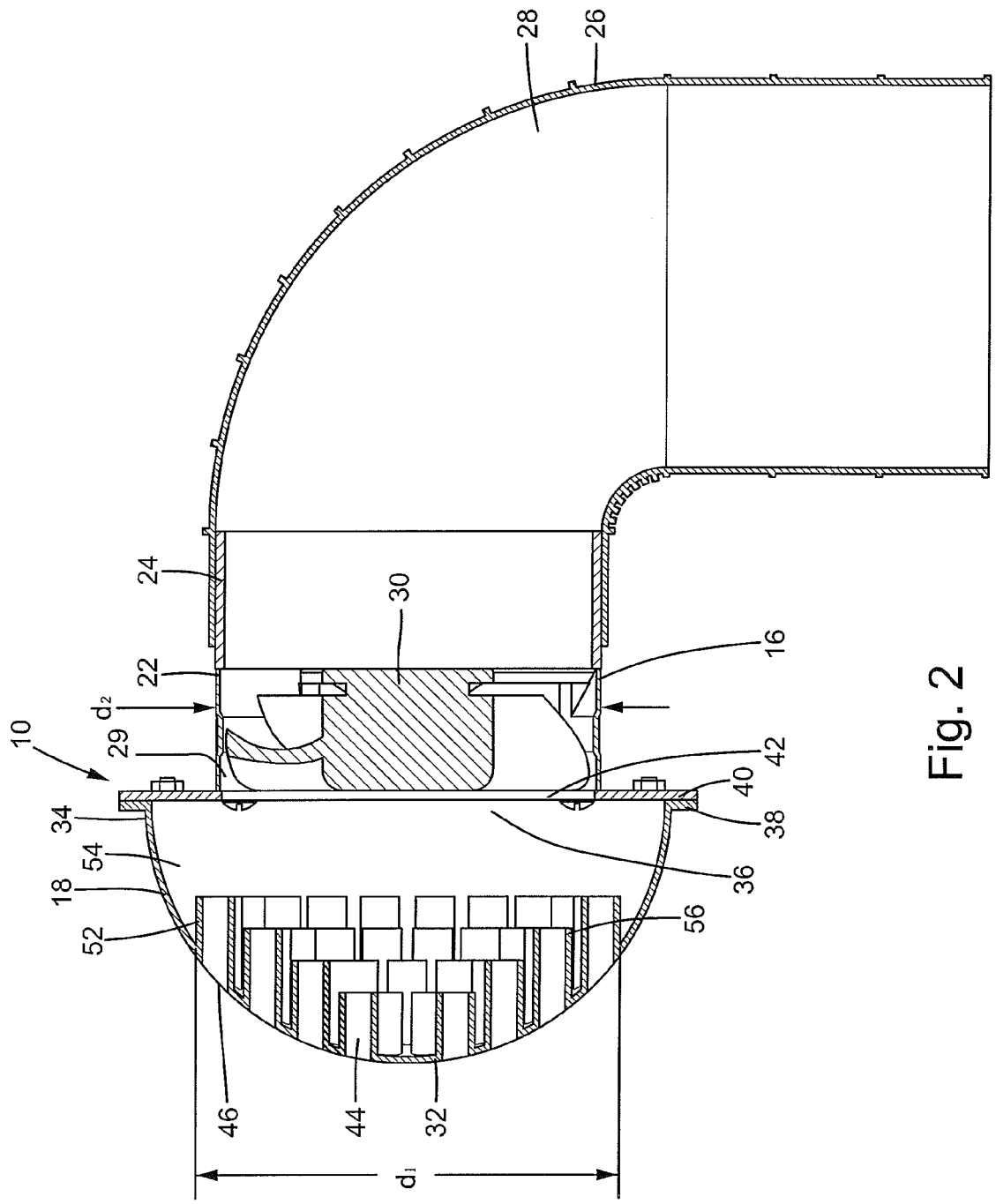
FIG. 2 shows a cross sectional view of the ventilation device of FIG. 1.
Figure 3:
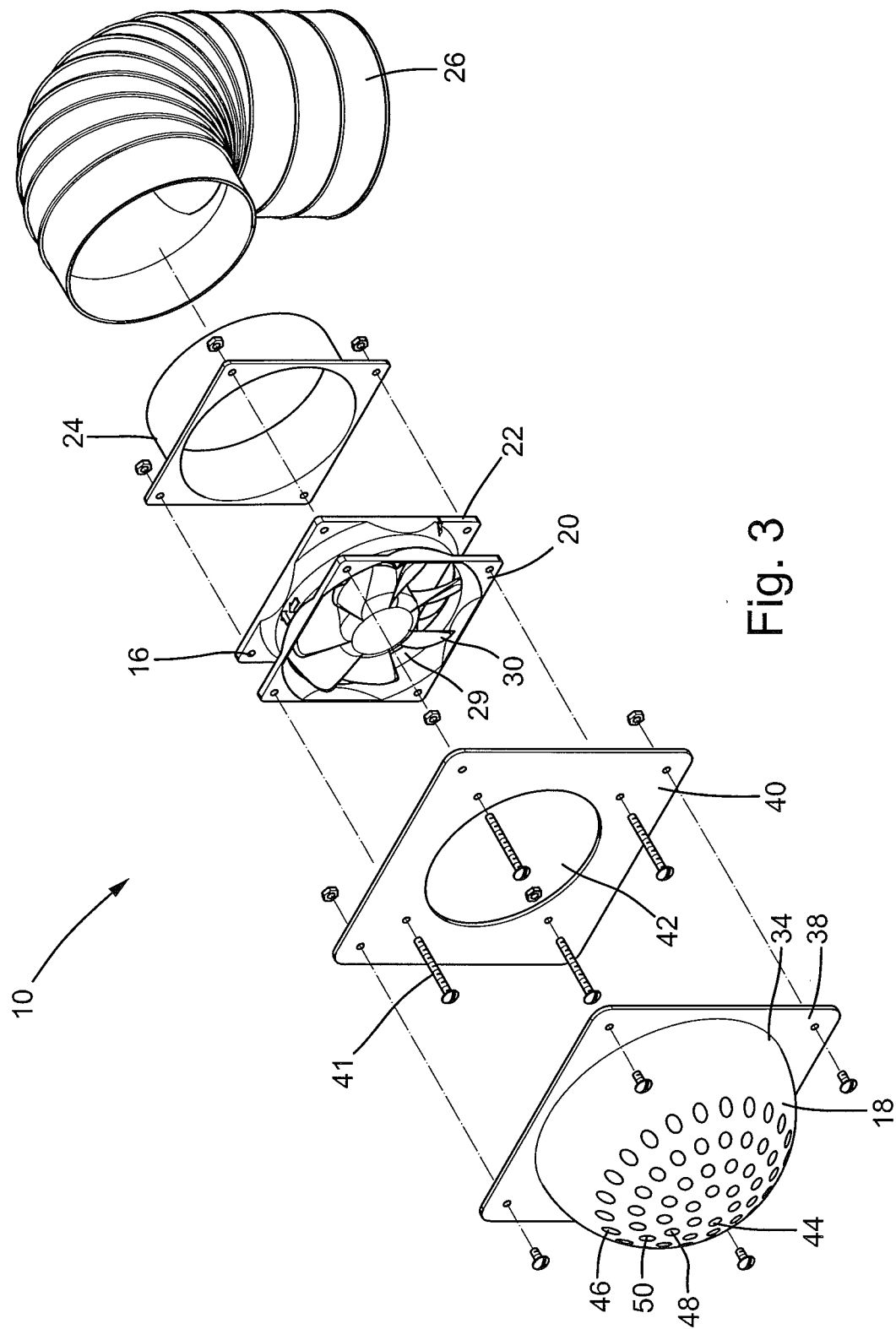
FIG. 3 shows an exploded, perspective view of the ventilation device of FIG. 1.
Figure 4:
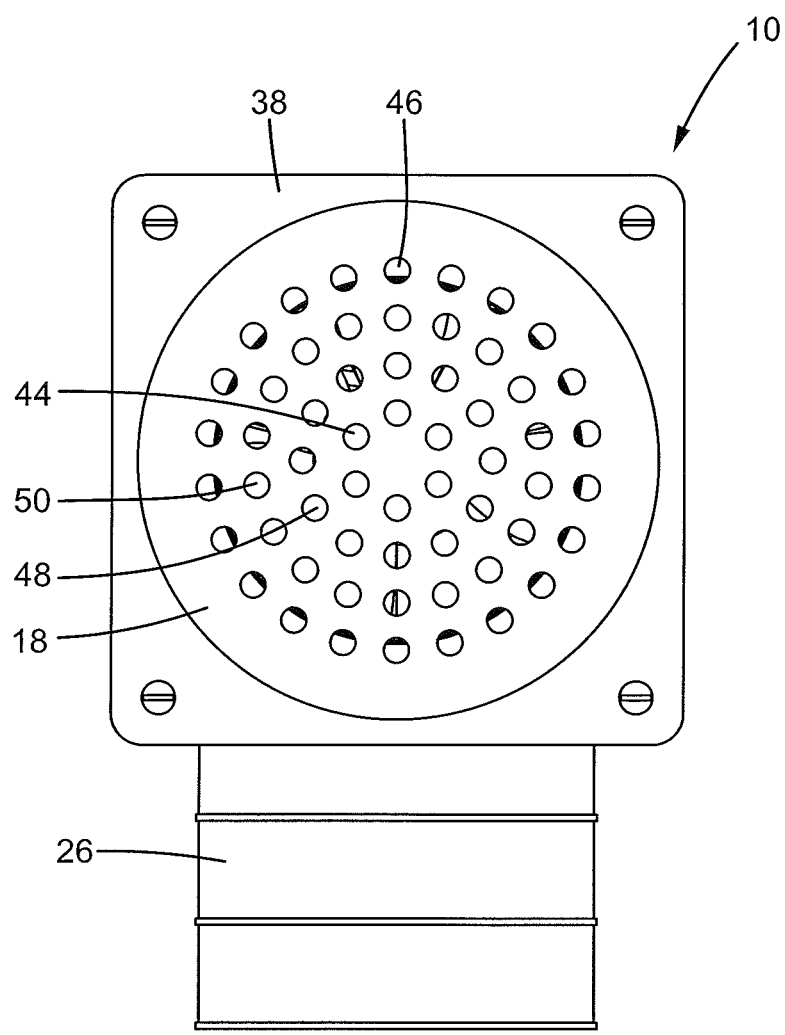
FIG. 4 shows a front view of the ventilation device of FIG. 1.
Figure 5:
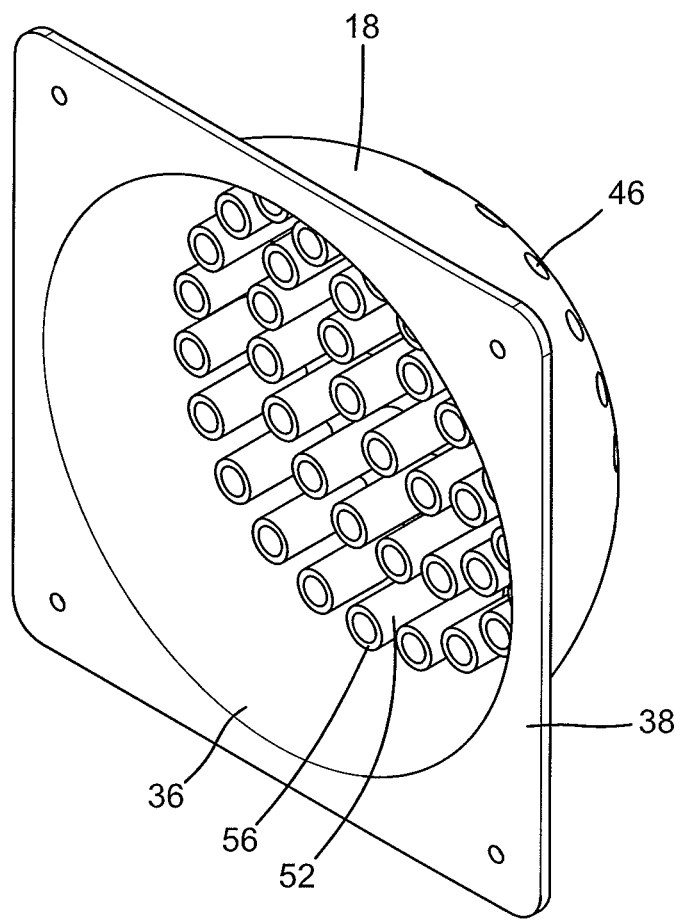
FIG. 5 shows a perspective view of the ventilation device of FIG. 3.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

DETAILED DESCRIPTION OF THE INVENTION

FIGS. 1-5 show an embodiment of a ventilation device 10 according to the present invention. The ventilation device 10 can be mounted in an air outlet 14 of a closed or indoor space 12 to increase the convention between hot air and cold air, achieving an energy-saving effect.

The ventilation device 10 includes an impeller 16 and a housing 18. The impeller 16 includes an air inlet end 20 and an air outlet end 22 spaced from the air inlet end 20 along a central axis of the impeller 16. The air outlet end 22 of the impeller 16 is coupled to a front end of a pipe fitting 24. An elbow 26 is coupled to a rear end of the pipe fitting 24, with the elbow 26 and the pipe fitting 24 defining an air exhaust path 28. The air inlet end 20 of the impeller 16 includes an air inlet 29. The impeller 16 includes blades 30 and is electrically connected to a switch that can be activated to drive the blades 30 to rotate, sucking air into the air inlet 29 and moving the air to the air exhaust path 28 via the air outlet end 22.

The housing 18 is hemispherical and includes a front end 32 and a rear end 34 spaced from the front end 32 along the central axis of the impeller 16. The rear end 34 includes an opening 36 that is circular in cross section. The housing 18 further includes a connecting portion 38 in the form of a flange extending radially outward from the rear end 34. The rear end 34 of the housing 18 is fixed to the air inlet end 20 of the impeller 16. In this embodiment, a connecting board 40 is mounted between the connecting portion 38 and the air inlet end 20 of the impeller 16, and fasteners 41, such as screws, are used to fix the housing 18 and the impeller 16 together. The connecting board 40 includes a through-hole 42 in a center thereof, with the through-hole 42 substantially coaxial to the opening 36 of the housing 18 and the air inlet 29 of the impeller 16. Furthermore, the through-hole 42 has a diameter substantially the same as an inner diameter of the air inlet end 20 of the impeller 16 but smaller than a diameter of the opening 36 of the housing 18.

The housing 18 includes a hemispherical wall defining an interior space 54 and having a plurality of holes. In this embodiment, the hemispherical wall of the housing 18 includes a set of inner holes 44 that are annularly spaced, a set of outer holes 46 that are annularly spaced, and two sets of intermediate holes 48 and 50, with the intermediate holes 48 annularly spaced from each other, and with the intermediate holes 50 annularly spaced from each other. Each set of inner, outer, and intermediate holes 44, 46, 48, and 50 is arranged in a circumferential direction about a central axis of the housing 18. Furthermore, the set of inner holes 44, the set of outer holes 46, and the sets of intermediate holes 48 and 50 are spaced from each other in a radial direction perpendicular to the central axis of the housing 18. A first spacing between each inner hole 44 and the central axis of the housing 18 is smaller than a second spacing between each intermediate hole 48, 50 and the central axis of the housing 18. The second spacing is smaller than a third spacing between each outer hole 46 and the central axis of the housing 18. In this embodiment, the central axis of the housing 18 is coaxial to the central axis of the impeller 16 or to the rotating axis of the blades 30 (i.e., the rotating axis of the impeller 16). Furthermore, an outer diameter d1 of the whole set of outer holes 46 is substantially equal to an outer diameter d2 of the air inlet 29 of the impeller 16.

Figure 6:
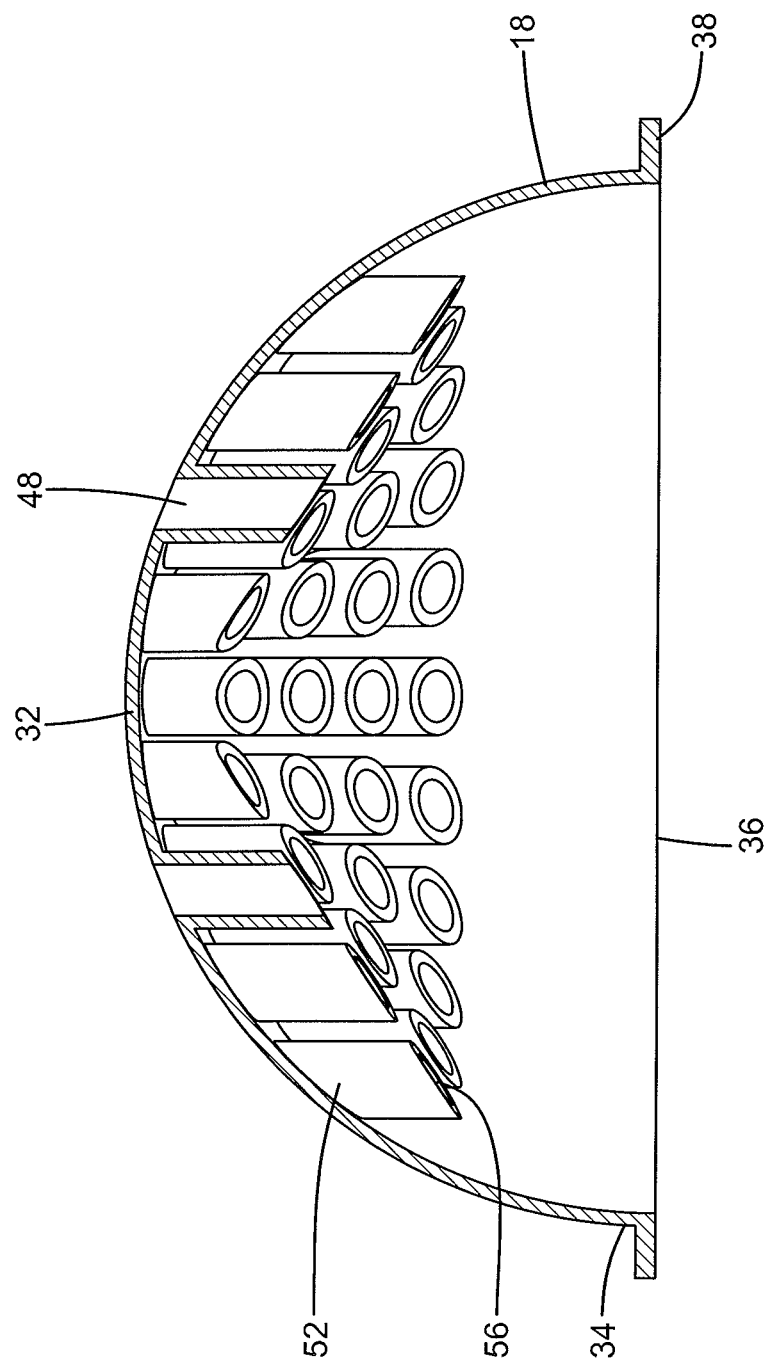
FIG. 6 shows a cross sectional view of another example of a housing of the ventilation device according to the present invention.

The housing 18 further includes a plurality of tubes 52, with each tube 52 formed on an inner face of the hemispherical wall and extending from one of the inner holes 44, the outer holes 46, and the intermediate holes 48 and 50 into the interior space 54, with each tube 52 spaced from the rear end 34 of the housing 18. In this embodiment, a first length of each tube 52 extending from one of the inner holes 44 is smaller than a second length of each tube 52 extending from one of the intermediate holes 48 and 50. The second length is smaller than a third length of each tube 52 extending from one of the outer holes 46. Each tube 52 includes a hole coaxial to and having an inner diameter equal to a corresponding one of the inner holes 42, the outer holes 46, and the intermediate holes 48 and 50. Furthermore, each tube 52 includes an inner end face 56 located in the interior space 54 and extending perpendicularly to the central axis of the housing 18. In another embodiment shown in FIG. 6, the inner end face 56 of each tube 52 is at an acute angle to the central axis of the housing 18. However, each tube 52 can be detachably mounted to the inner face of the hemispherical wall of the housing 18.

FIG. 1 illustrates use of the ventilation device 10 in the air outlet 14 of the indoor space 12. Activation of the impeller 16 can be controlled by operation of an air conditioner 58 in the indoor space 12. Namely, when cold air is outputted from the air conditioner 58, the impeller 16 is activated to move the hot air from the air inlet end 20 to the air outlet end 22, expelling the hot air in the indoor space 12 to the outdoors through the air exhaust path 28.

Figure 7:
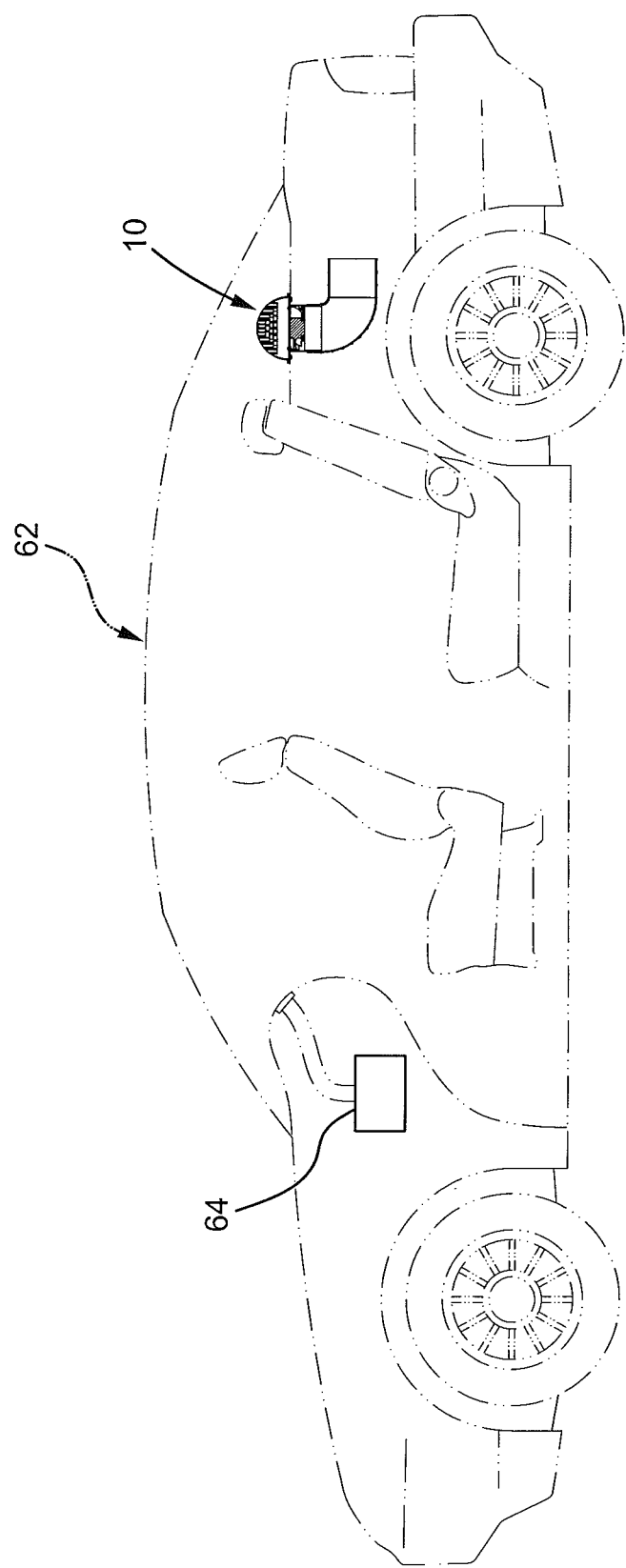
FIG. 7 shows a schematic view illustrating use of the ventilation device according to the present invention in a car.

FIG. 7 illustrates use of the ventilation device 10 in a car 62. When cold air is outputted from an air conditioner 64, the impeller 16 is activated to expel the hot air in the car 62.

Since the housing 18 includes a plurality of sets of annularly spaced inner, outer, and intermediate holes 44, 46, 48 and 50, a negative pressure area is formed in front of the air inlet 29 of the impeller 16. Thus, after the impeller 16 is activated, the hot air currents 60 in the indoor space 12 can rapidly flow to the negative pressure area rather than staying in the indoor space 12, increasing the air convection in the indoor space 12. Specifically, due to provision of the plurality of sets of inner, outer, and intermediate holes 44, 46, 48, and 50, the hot air currents 60 can smoothly flow into the interior space 54 via the plurality of sets of inner, outer, and intermediate holes 44, 46, 48 and 50 and then be expelled to the outdoors via the air exhaust path 28. Furthermore, the tubes 52 in the housing 18 can limit the flowing direction of the hot air currents 60, avoiding formation of turbulence outside of the housing 18 and avoiding backflow in the housing 18, further enhancing the air convection effect. The hot air currents 60 can be more smoothly guided into the housing 18 in the embodiment having inclined inner end faces 56 shown in FIG. 6, such that the air entering the housing 18 via the plurality of sets of inner, outer, and intermediate holes 44, 46, 48 and 50 will not flow out of the housing 18 in the reverse direction.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. A ventilation device comprising:
an impeller including an air inlet end and an air outlet end spaced from the air inlet end along a central axis of the impeller, with the air inlet end of the impeller including an air inlet, with the impeller rotatable to suck air into the air inlet and to move the air from the air inlet to the air outlet end; and
a housing including a front end and a rear end spaced from the front end along the central axis of the impeller, with the housing including an opening in the rear end, with the rear end of the housing fixed to the air inlet end of the impeller, with the housing including a hemispherical wall having an inner face, with the hemispherical wall defining an interior space, with the hemispherical wall having a plurality of inner holes and a plurality of outer holes, with the plurality of inner holes annularly spaced from each other in a circumferential direction about a central axis of the housing, with the plurality of outer holes annularly spaced from each other in the circumferential direction about the central axis of the housing, with the plurality of inner holes spaced from the plurality of outer holes in a radial direction perpendicular to the central axis of the housing, with a plurality of first tubes formed on the inner face of the semispherical wall, with each of the plurality of first tubes extending from one of the plurality of inner holes into the interior space but spaced from the rear end of the housing, with a plurality of second tubes formed on the inner face of the semispherical wall, with each of the plurality of second tubes extending from one of the plurality of outer holes into the interior space but spaced from the rear end of the housing.

2. The ventilation device as claimed in claim 1, with the hemispherical wall of the housing further including a plurality of intermediate holes annularly spaced from each other, with a first spacing between each of the plurality of inner holes and the central axis of the housing being smaller than a second spacing between each of the plurality of intermediate holes and the central axis of the housing, with the second spacing being smaller than a third spacing between each of the plurality of outer holes and the central axis of the housing, with a plurality of third tubes formed on the inner face of the semispherical wall, with each of the plurality of third tubes extending from one of the plurality of intermediate holes into the interior space but spaced from the rear end of the housing, with each of the first tubes having a first length smaller than a second length of each of the second tubes, with each of the third tubes having a third length larger than the first length and smaller than the second length, with each of the first, second, and third tubes including a hole coaxial to and having an inner diameter equal to a corresponding one of the plurality of inner holes, the plurality of outer holes, and the plurality of intermediate holes.

3. The ventilation device as claimed in claim 2, further comprising: a connecting board mounted between the rear end of the housing and the air inlet end of the impeller, with the connecting board including a through-hole coaxial to the opening of the housing and to the air inlet of the impeller, with the through-hole of the connecting board having a diameter substantially equal to an inner diameter of the air inlet of the impeller but smaller than a diameter of the opening of the housing.

4. The ventilation device as claimed in claim 2, with the central axis of the housing being coaxial to a rotating axis of the impeller, with an outer diameter of all of the plurality of outer holes being substantially equal to an outer diameter of the air outlet end of the impeller.

5. The ventilation device as claimed in claim 4, with each of the first, second, and third tubes having an inner end face located in the interior space of the housing, with the inner end face of each of the first, second, and third tubes extending perpendicularly to the central axis of the housing.

6. The ventilation device as claimed in claim 4, with each of the first, second, and third tubes having an inner end face located in the interior space of the housing, with the inner end face of each of the first, second, and third tubes being at an acute angle to the central axis of the housing.

\* \* \* \* \*